United States Patent [19]

Imazeki et al.

[11] 4,370,705
[45] Jan. 25, 1983

[54] SEQUENCE CONTROL SYSTEM FOR NUMERICALLY CONTROLLED MACHINE TOOL

[75] Inventors: Ryoji Imazeki, Hachioji; Katsuaki Kusumi, Kawasaki; Yoshihiro Nakajima, Hino, all of Japan

[73] Assignee: Fujitsu Fanuc Limited, Tokyo, Japan

[21] Appl. No.: 185,809

[22] Filed: Sep. 10, 1980

[30] Foreign Application Priority Data

Sep. 18, 1979 [JP] Japan ................................. 54/119628

[51] Int. Cl.³ ............................................. G06F 13/00
[52] U.S. Cl. ..................................... 364/184; 364/167; 364/551; 364/200; 371/68
[58] Field of Search ........ 364/200, 119, 551, 184–186, 364/468, 472, 474, 475, 167, 168; 371/25, 68

[56] References Cited

U.S. PATENT DOCUMENTS

| | | | |
|---|---|---|---|
| 3,283,307 | 11/1966 | Vigliante | 364/200 |
| 3,707,703 | 12/1972 | Sakai | 364/200 |
| 3,813,530 | 5/1974 | Chevalier et al. | 371/25 |
| 3,898,621 | 8/1975 | Zelinski et al. | 364/200 |
| 4,118,789 | 10/1978 | Casto et al. | 371/68 X |
| 4,288,849 | 9/1981 | Katsunori | 364/119 X |

*Primary Examiner*—Edward J. Wise
*Attorney, Agent, or Firm*—Staas & Halsey

[57] ABSTRACT

A numerically controlled machine tool is equipped with a programmable sequence controller having a first storage area capable of storing operation commands, and a second storage area capable of storing a duplicate of the data planted in the first storage area without erasing the planted data. An operation command, when sent from a numerical control device to the machine tool, is stored in the first storage area and then, when the machine tool has completed the instructed operation, is read out from the first storage area and stored in the second storage area, this operation being repeated as each new command is issued. When electric power is connected to the machine tool, the data stored in the first and second storage areas is compared, an alarm being generated when the two sets of data do not agree.

4 Claims, 2 Drawing Figures

FIG. 2

| ADDRESS | MEMORY LOCATION |
|---|---|
| A1 | T14 |
| A2 | |
| A3 | |
| A4 | |
| B1 | T01 |
| B2 | |
| B3 | |
| B4 | |

A → {A1, A2, A3, A4}
B → {B1, B2, B3, B4}

SEQUENCE CONTROL SYSTEM FOR NUMERICALLY CONTROLLED MACHINE TOOL

BACKGROUND OF THE INVENTION

This invention relates to a sequence control system for a numerically controlled machine tool equipped with a programmable sequence controller.

The operation of machine tools is controlled in order to effect a variety of tasks, such as the automatic change of tools, by combining a numerical control device (referred to hereinafter as an NC) and a programmable sequence controller (referred to hereinafter as a PC). The control of a machine tool through this combination of the NC and PC is carried out in the following manner. Numerical control information stored in a storage medium such as a perforated tape is read in the NC which then processes the information. After all of the necessary machining data for controlling the relative movement between the workpiece and tool, such as feed speed and the numerical values relating to dimensions, has been processed by a pulse distribution operation or the like, the data is sent directly from the NC to the machine tool side, whereas information other than that directly required for the abovementioned control of relative movement, such as information pertaining to the change of tools, is sent to the PC where it is stored. After the PC has determined that the conditions for a tool change on the machine tool side have been established by receiving from the machine tool such signals as a spindle oriented stop signal, the PC sends tool change information to the machine tool which responds to the command from the PC so as to effect the tool change. This entire series of operations is executed in accordance with the program that has been loaded in the PC.

Factories or plants where machine tools are installed do not always possess power distribution facilities that are ideal in nature, and some of them have very poor power source environments. Machine tools installed in locations beset by these problems encounter abnormal conditions such as large fluctuations in power source voltage and interruptions in power, followed by a restoration of normal power source voltage after a short period of time. If a machine tool equipped with a PC and NC encounters a brief interruption in power, the machine tool may, for example, fail to execute an instruction issued by the PC. If the interruption in power occurs during the execution of an instruction, the machine tool may stop functioning in the middle of an operation. Once the power source voltage has returned to normal following restoration of power, the PC, NC and machine tool begin functioning again. When this occurs the NC and PC send new instructions to the machine tool since the machine tool operation instructed prior to the power interruption is taken as being completed. However, this operation instructed before the interruption may never have been executed or may have stopped during execution. Therefore, when the PC and NC issue new instructions following the restoration of power transmission, the machine tool initiates an operation in accordance with the new instructions and leaves the immediately preceding task or operation unfinished. This not only leads to a break in the sequential control of the machine tool but also results in an unsatisfactorily machined workpiece.

BRIEF SUMMARY OF THE INVENTION

Accordingly, it is an object of the present invention to provide a sequence control system for a numerically controlled machine tool equipped with a PC, in which the sequential control of the machine tool can be executed smoothly without a disruption when the machine tool resumes operation following a temporary halt caused by an interruption in power or the like which occurs when the machine tool is functioning.

It is another object of the present invention to provide a sequence control system for a numerically controlled machine tool equipped with a PC, in which an alarm is issued immediately upon any disruption in the sequence control of the machine tool when the machine tool resumes operation following a temporary halt caused by an interruption in power or the like which occurs when the machine tools is functioning.

It is a further object of the present invention to provide a sequence control system for a numerically controlled machine tool equipped with a PC, in which means can be adopted for stopping the machine tool immediately upon any disruption in the sequential control of the machine tool when the machine tool resumes operation following a temporary halt caused by an interruption in power or the like which occurs when the machine tool is functioning.

Other features and advantages of the invention will be apparent from the following description taken in connection with the accompanying drawings.

BRIEF DESCRIPTION OF THE DRAWINGS

FIG. 2 shows the structure of a non-volatile memory incorporated in the PC of FIG. 1.

DETAILED DESCRIPTION OF THE PREFERRED EMBODIMENT

Figure 1:
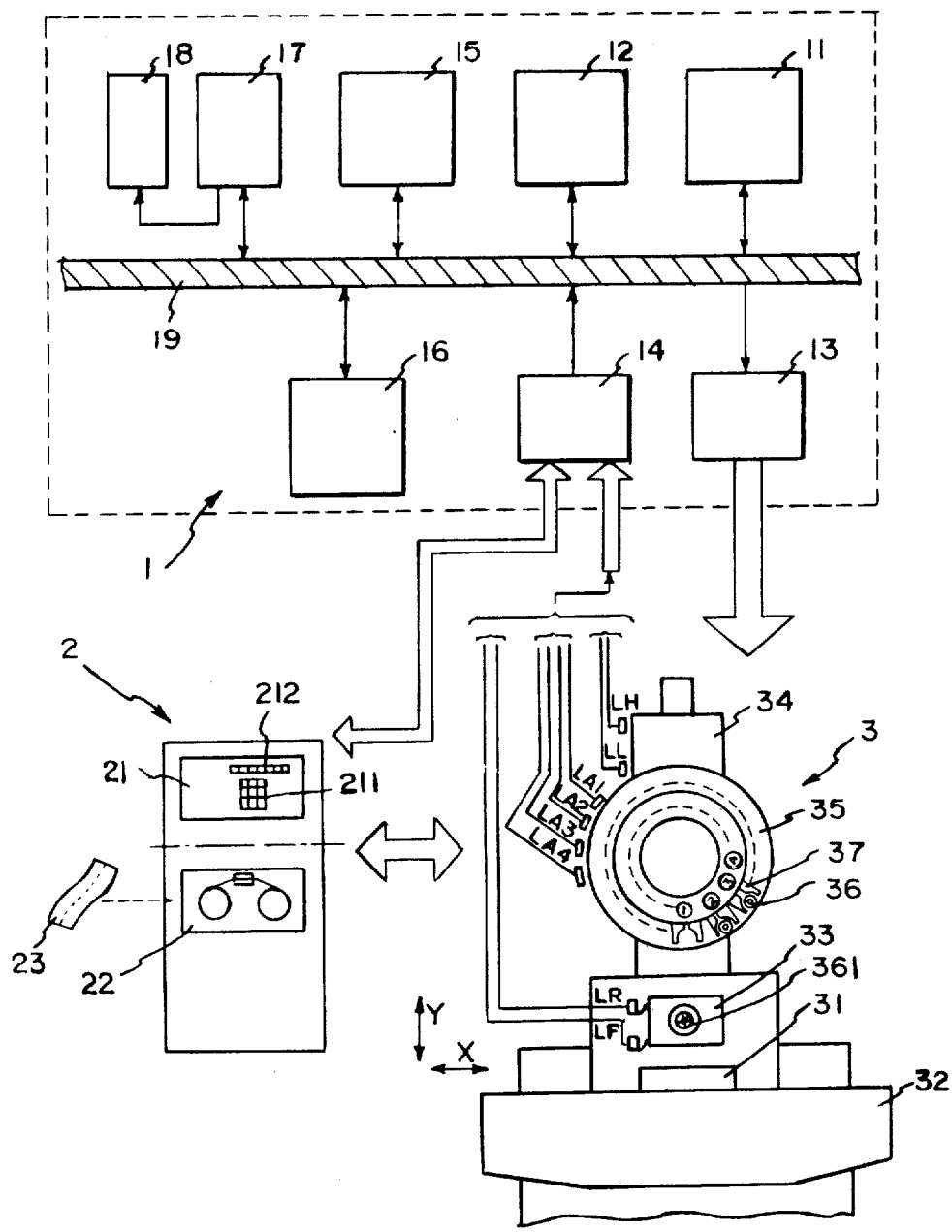
FIG. 1 shows the structure of a numerically controlled machine tool equipped with a PC in accordance with the present invention, with the PC being illustrated in the form of a block diagram.

Illustrated in FIG. 1 is the arrangement of a numerically controlled machine tool embodying the present invention. The arrangement includes a PC 1, an NC 2 and a machine tool 3 such as a machining center which is to be controlled. The detailed structure of these units will become apparent as the description proceeds. Included in the PC 1 are a program memory 11, which ordinarily comprises a read-only memory, for storing programmed sequence commands for controlling the machine tool 3, an operational control section 12, an output unit 13 for delivering command signals to the machine tool 3, an input unit 14 for receiving operation signals from the machine tool 3 and commands from the NC 2 and for entering these signals and commands in the PC 1, a working memory 15 is for temporarily storing sequence data presently under execution, a non-volatile memory 16 whose addresses are divided into a group A and a group B, as shown in FIG. 2, a comparator 17 which issues a signal if non-coincidence is detected upon comparing the data planted in the locations identified by the group A addresses in memory 16 and the data planted in the locations identified by the group B addresses, where the term "plant" means placing data in a location where it will be used at a later stage in the program, and an alarm generating circuit 18. Numeral 19 denotes a data bus.

The NC 2 includes a data input and display section 21 having input keys 211 and a display unit 212, a tape reader 22, and a perforated tape 23 which is accommodated in the tape reader 22. Numerical control information is punched in the tape 23 and read block-by-block by the tape reader 22 as the machine tool is being operated.

The machine tool 3 includes a table 31 for supporting a workpiece, a base 32 which is adapted to transport the table 31 in X-, Y- and Z-directions, a spindle head 33 having a spindle for mounting a tool and which itself is adapted for movement in the Z direction, a main column 34, a magazine 35, movable vertically along the main column 34, for rotatively driving a plurality of tools 36, and a holding member 37 for holding the arbor of a corresponding tool 36.

The illustrated automatic tool changing mechanism performs a tool change in the following manner:

(1) The magazine 35 is lowered along the Y-axis, permitting the holding member 37 to grasp a tool 361 fitted in the spindle.

(2) The spindle head 33 is retracted in the Z-direction, with the result that the tool 361 is retracted from the spindle and received in the magazine 35.

(3) The magazine 35 is rotated while in the lowered position and then stopped when a desired tool is at a position which coincides with the spindle axis.

(4) The spindle head 33 is moved forward in the Z-direction to receive the tool being held in the magazine.

(5) The magazine 35 is raised.

The PC1, NC2 and machine tool 3 operate in combination in the following manner.

First, let the old tool 361 mounted in the spindle have a tool number of T01. To change the old tool 361 for another tool whose tool number we shall denote T14, the NC 2 sends the PC 1 the operation instruction T14M06*, where T14 is the number of the new tool to be selected, M06 is a miscellaneous function command indicative of tool change, and * represents the end of a block. This operation instruction is stored in the working memory 15 of the PC 1, with the number T14 of the new tool to be selected being planted in the non-volatile memory 16 of the PC 1 at one of the addresses, for example the address A1, of the group A addresses. As will be described in more detail later, the data T14 planted at the address A1 will be shifted to one of the addresses, say the address B1, of the group B addresses of the non-volatile memory 16 when the tool change operation has been completed. However, at this point in time, the data planted at the address B1 is the tool number T01 of the tool 361. Since the PC 1 causes the machine tool to execute the above said operation instruction, the machine tool responds by performing a series of operations in accordance with the sequence made up of the steps (1) to (5) described above. The following operational process is carried out in order to rotatively index the magazine 35.

(1) The present address of the magazine 35 is read, this being based on information from limit switches LA1 through LA4.

(2) A search is conducted to locate that address of the magazine 35 that is to receive the tool 361 mounted in the spindle. Specifically, this means reading out the contents (tool number T01) located at the address B1. In accordance with the present embodiment, the tool number and the particular address of the magazine 35 are made to coincide. Thus, the arrangement is such that the tool whose number is T01, for example, will be received at the address 01 of the magazine 35.

(3) Ordinarily the addresses read out in (1) and (2) above are in coincidence. When such coincidence is confirmed, the lowering operation of the magazine 35 begins. When the holding member has grasped the tool 361, this fact is confirmed by a signal from a limit switch LL which is actuated when the lowering operation of the magazine 35 is completed.

(4) Next there is a shift to retraction of the spindle head 33. Completion of this operation is detected on the basis of a signal from a limit switch LR.

(5) Next, to select the tool (tool number T14) newly designated by the instruction, the number 14 corresponding to the tool number T14 is designated the command address. The direction in which the magazine 35 is to rotate is decided by this command address and by the present address of the magazine 35 as read from the limit switches LA1 through LA4. The magazine 35 is then rotated in the direction which has been decided and comes to a stop at the position where the command address and present address come into coincidence. The tool having the tool number T14 now coincides with the axis of the spindle.

(6) The spindle head 33 is moved forward to receive the tool whose number is T14. This is confirmed by the limit switch LF.

(7) The magazine 35 is raised. When this operation is completed, that is, when the magazine comes to a stop, this is confirmed by limit switch LH.

(8) When the above sequence (1) through (7) has been executed, the content T14 at the address A1 of memory 16 is read out and then written at the address B1. As a result, the content at the address B1 changes from T01 to T14, so that the contents at the addresses A1, B1 are identical, i.e., T14.

If an interruption in power should happen to occur at any point in the sequence from (1) through (7), reading out and comparing the contents at the addresses A1 and B1 following the restoration of power will permit detection of non-coincidence between the two (the content at address A1 being T14 and the content at address B1 being T01). This allows the generation of an alarm signal. Furthermore, since the tool number of the tool actually mounted in the spindle is retained at the address B1 of memory 16 even when the machine tool resumes operation following the restoration of power, the tool number can be displayed on the display unit 212 of the data input and display section 21 by calling this information through operating the keys 211. When the contents at the addresses A1 and B1 do not coincide following the restoration of power, the operator:

(1) checks the tool change status and then rewrites correctly the content at address B1, and permits the machine tool to resume operating, if it is found that the instructed tool is mounted in the spindle, or (2) checks the tool change status and then, using the keys 211 on the data input section 21, manually reenters the tool change instruction if it is found that the instructed tool has not yet been mounted in the spindle. When the tool change operation has been completed in this manner, the operator permits the machine tool to resume operating.

The present invention as described hereinabove thus provides a PC with non-volatile first and second storage areas for storing doubly an operation command. An operation command, when applied to the machine tool, is stored in the first storage area and then stored in the second storage area after the machine tool has completed the instructed operation, this procedure being repeated as each new command is issued. When power is connected to the machine tool, the comparator compares the data stored in the first and second storage areas and determines that an instructed operation has not been completed by detecting non-coincidence between the two sets of data. Thus, when power is restored following a power interruption which has occurred during a machine tool operation, the arrangement described above permits any discrepancy between a command from the numerical control equipment and the operating condition of the machine tool to be discovered prior to the resumption of machine tool operation.

Although the invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A numerical control system for a numerically controlled machine tool whose sequence operation results from command data applied to the machine tool from an NC unit and is controlled through a programmable sequence controller interposed between the NC unit and the machine tool comprising:

a first non-volatile storage area means, provided in the programmable sequence controller, for storing command data applied to the machine tool;
   a second non-volatile storage area means, provided in the programmable sequence controller, for storing a duplicate of the command data stored in said first non-volatile storage area means when the machine tool issues a signal indicating that it has completed an operation in accordance with the command data; and
   a comparator means, provided in the programmable sequence controller, for comparing the contents of said first and second non-volatile storage area means, when electric power is connected to the machine tool.

2. The numerical control system according to claim 1, wherein the data stored in said first non-volatile storage area means is updated whenever the command data applied to the machine tool is updated.

3. The numerical control system according to claim 1, further comprising an alarm means for issuing an alarm when said comparator means detects non-coincidence between the contents of said first and second non-volatile storage area means.

4. The numerical control system according to claim 1, further comprising an operation stop means for delivering a signal to the machine tool to stop the operation thereof when said comparator means detects non-coincidence between the contents of said first and second non-volatile storage area means.

* * * * *